United States Patent [19]

Kindt-Larsen

[11] Patent Number: 5,080,839
[45] Date of Patent: Jan. 14, 1992

[54] PROCESS FOR HYDRATING SOFT CONTACT LENSES

[75] Inventor: Ture Kindt-Larsen, Vedbaek, Denmark

[73] Assignee: Johnson & Johnson Vision Products, Inc., Jacksonville, Fla.

[21] Appl. No.: 510,325

[22] Filed: Apr. 17, 1990

[51] Int. Cl.⁵ .............................. B29D 11/00
[52] U.S. Cl. ........................ 264/2.6; 206/5.1; 264/1.7; 264/2.3; 264/344
[58] Field of Search ............ 264/2.6, 2.3, 1.7, 344; 206/5.1; 351/162

[56] References Cited

U.S. PATENT DOCUMENTS

| | | | |
|---|---|---|---|
| 3,115,146 | 12/1963 | Erwin | 206/5.1 |
| 4,495,313 | 1/1985 | Larsen | 523/106 |
| 4,565,348 | 1/1986 | Larsen | 249/122 |
| 4,640,489 | 2/1987 | Larsen | 249/122 |
| 4,807,750 | 2/1989 | Ryder et al. | 206/5.1 |
| 4,860,885 | 8/1989 | Kaufman et al. | 206/5.1 |
| 4,890,729 | 1/1990 | Ramalletta | 206/5.1 |

FOREIGN PATENT DOCUMENTS

| | | | |
|---|---|---|---|
| 2902549 | 8/1979 | Fed. Rep. of Germany | 1/1 |
| 1403667 | 8/1975 | United Kingdom | 206/5.1 |

*Primary Examiner*—James Lowe
*Attorney, Agent, or Firm*—Paul A. Coletti; Joel Petrow

[57] ABSTRACT

A process for releasing leachable substances from a polymeric contact lens blank. the contact lens is confined in a cavity within a carrier to permit the hydration of the lens without permitting it to invert or roll over. A fluid flow is introduced into the cavity about the lens to extract leachable material from the lens. The process significantly reduces the amount of leaching fluid that is used and the amount of time that is needed for hydration, washing and extraction.

37 Claims, 5 Drawing Sheets

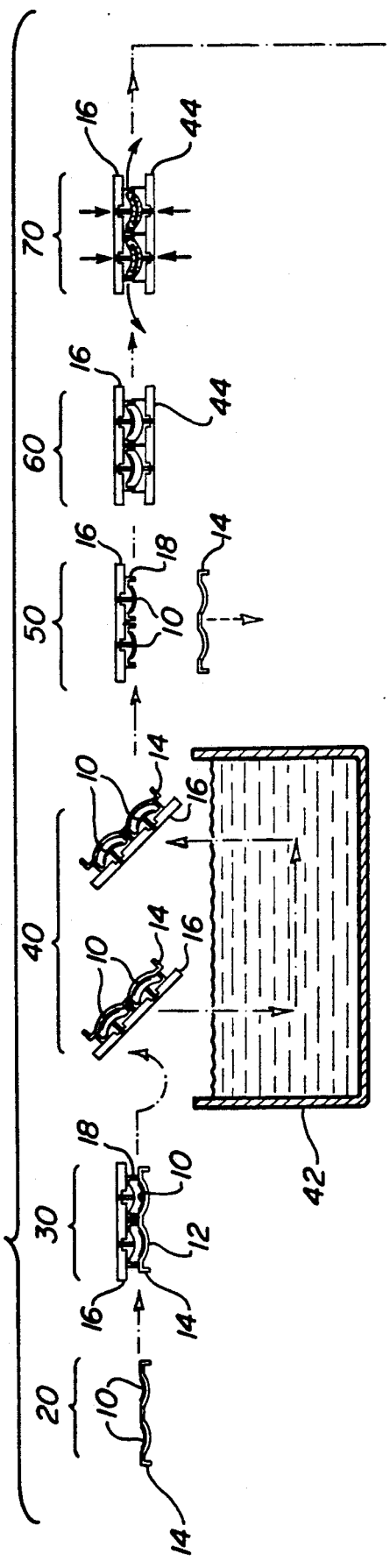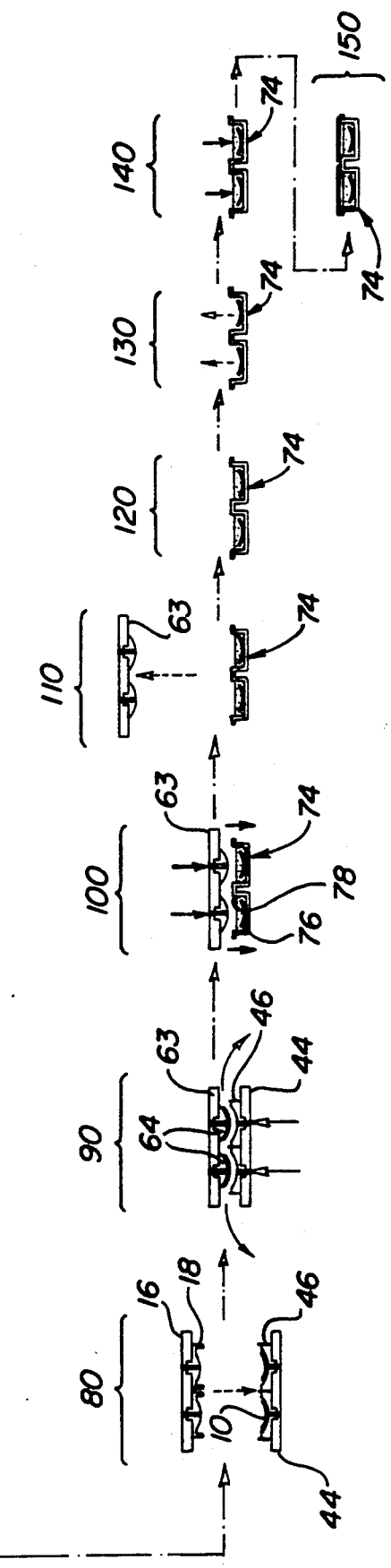
FIG-1

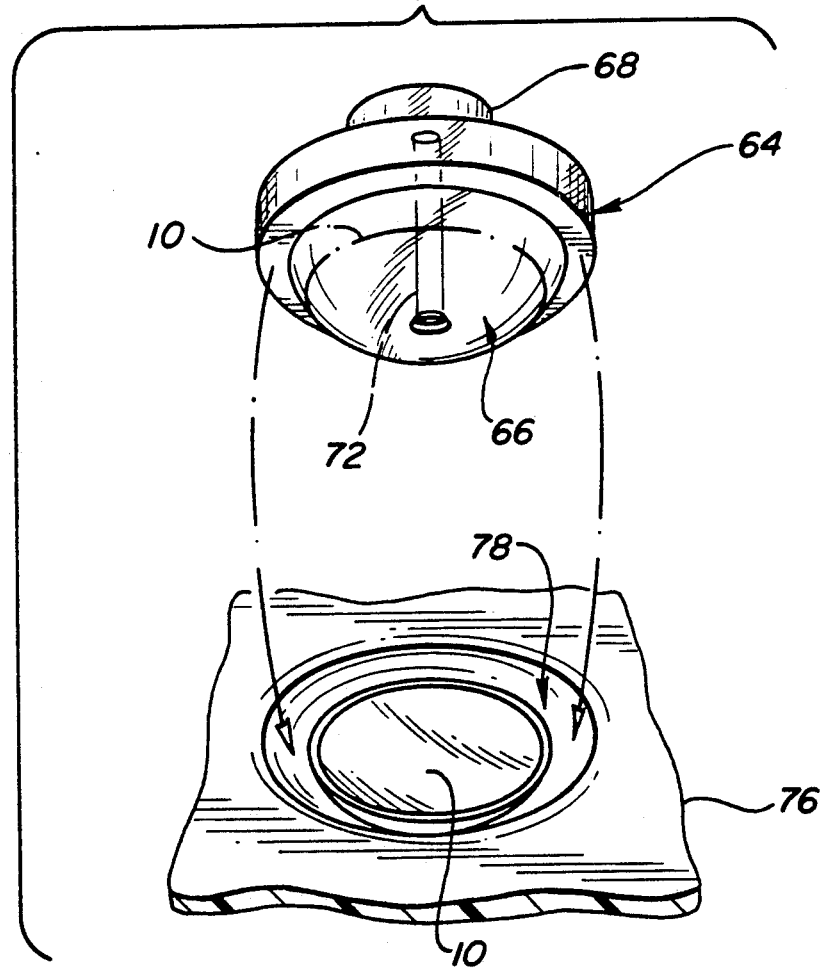

PROCESS FOR HYDRATING SOFT CONTACT LENSES

The present invention relates to a process for removing leachable substances from polymeric contact lenses, and more particularly, for hydrating soft contact lenses by exchanging leachable substances for water, and still more particularly, for conducting the leaching or hydrating of contact lenses while maintaining the orientation of the lens throughout the process to reduce the need for physical handling of the lens.

BACKGROUND OF THE INVENTION

Soft contact lenses can be made from hydrophilic polymers also known as hydrogels by many processes, for example, by molding, spin casting or lathe cutting.

During the initial steps of manufacturing hydrogel lenses by lathe cutting, the hydrogel is maintained in a dry state so that it may be manipulated on the lathe to cut the desired optical surfaces. It is then polished, removed from the lathe, hydrated, inspected and packaged. Spin cast lenses can be made by subjecting a liquid monomer to a centrifical force in a mold which has the same shape as the desired optical surfaces of the lens. As the mold spins, the monomer is cured to form the lens. The lens is then typically polished in the mold, hydrated from the mold, inspected and packaged. Other lenses may be molded from liquid monomer and catalyst confined in a space between two mold halves which control the shape of the lens. The monomer is cured, the mold halves separated and the lens is hydrated, inspected and packaged. The hydration step in all of these processes can be time consuming, difficult to control and somewhat unpredictable so that the manufacturing process can be inefficient and sometimes expensive.

In carrying out many of the processes for making contact lenses, significant amounts of manual handling of the lens may be required. Handling the lens in the dry state can dirty or scratch the lens. Handling the lens in the delicate wet state can cause tears and other imperfections. It would be particularly useful to have a lens manufacturing process which would minimize the handling of the lens.

When removing a lens from a final package, a user often has difficulty orienting the lens properly for placement on the cornea of the eye. Sometimes the lens inverts or rolls over so that the user can inadvertently put the wrong surface of the lens facing the cornea. It would be desirable to have a process in which one could control the orientation of the lens throughout the process and uniformly place the lens in the package so that it could be consistently removed by the user in the proper orientation for placement on the cornea. It would also be useful to have a package specially designed to maintain the orientation of the lens during storage and shipping.

The Assignee of the present invention molds its contact lenses in two-part molds like those shown in U.S. Pat. Nos. 4,565,348 and 4,640,489. Liquid monomer is placed in a concave mold surface and then covered with a lid and cured, for example, by ultraviolet light. During polymerization, particularly of hydrogels, the lens tends to shrink. To reduce shrinkage, the monomer is polymerized in the presence of an inert diluent like boric acid ester as described in U.S. Pat. No. 4,495,313. The inert diluent fills up the spaces in the hydrogel lens during polymerization. The diluent is subsequently exchanged for water during the hydration process. Since the boric acid ester is inert but water soluble, it can be used to fill up the spaces in the hydrogel during polymerization to minimize shrinkage of the lens during polymerization and then exchanged for water to hydrate the lens. This process significantly improves the reliability of the manufacturing process and increases the ability to predict and maintain the dimensions of the lens during processing. The entire disclosure of U.S. Pat. Nos. 4,565,348; 4,640,489 and 4,495,313 are hereby incorporated by reference into the present patent application.

The process of exchanging the diluent for water and hydrating the lens can be very time consuming. The two-part mold is opened or demolded and the lenses are assembled in large groups and placed in a leaching tank for several hours. The leach tank includes heated water, small amounts of surface-active agents (surfactants) and salts. When the lenses are inserted in the leach tank they immediately expand in the presence of water and release from the mold in which they were molded. The boric acid ester diluent hydrolyzes into glycerol and boric acid leaving the water behind in the matrix of the lens to thus exchange diluent for water to partially hydrate the lens.

Salts and a ph buffer are used in the water so that the water placed in the lens has osmolality and ph substantially similar to that of human tears so that the lens will not irritate the eye when it is inserted by the user. If the polymer from which the lens is made has ionic characteristics the buffer neutralizes any ionic species in the lens. That neutralization causes some temporary destabilization of the dimensions of the lens and requires an extended period of time to complete.

The leach solution is then drained and the lenses are transferred to a rinse tank where the removal of diluent and surfactant continues for another extended period of time. The rinse solution is then drained and the lenses are transferred to a large equilibration tank filled with heated water and salts for completion of diluent and surfactant removal and equilibration of the lens for several more hours. The equilibration step entails completion of the neutralization of any ionic species in the polymer from which the lens is made and final hydration to the final water content and final dimensionals. The lens is then removed from the equilibration tank and rinsed in clean saline and transferred for inspection and then packaging.

It would be desirable to have a process for hydrating lenses that would reduce the amount of water, associated chemicals, like surfactants and salts, and the amount of time necessary to complete hydration and control the orientation of the lens.

It would also be useful to control the orientation of the lens during the hydration process so that it could consistently be placed in the package with the correct orientation.

SUMMARY OF THE INVENTION

The present invention alleviates many of the problems of the prior art by providing a process for hydrating contact lenses which is much faster, cheaper and predictable than the methods previously used. When used to hydrate a lens made in a two-part mold like those disclosed in U.S. Pat. Nos. 4,564,348 and 4,640,489 in the presence of a diluent like that disclosed in U.S. Pat. No. 4,495,313, the present process results in significant time and cost savings for hydrolyzing the diluent and exchanging it for water.

The process of the present invention may be used for extracting leachable substances from a polymeric contact lens blank which has an anterior and a posterior surface. The lens blank is placed in a first carrier element with the anterior surface of the lens blank oriented toward a first surface of the first carrier element. The first carrier element and the lens blank are then covered with a second carrier element. The first and second carrier elements cooperate to define a cavity to confine the lens blank and maintain the orientation of the lens blank without permitting it to invert or roll over. A fluid flow is then introduced into the cavity about the anterior and/or posterior surfaces of the lens and then permitted to flow out of the cavity to flush the leachable substances out of the lens blank. In this way, it is possible to extract a variety of substances like unreacted or partially reacted monomer or inhibitors using a variety of solvents like water, alcohol, a mixture of water and alcohol or any other organic solvent depending upon the material one wishes to leach from the lens blank.

The use of the first and second carrier elements to confine the lens in a cavity permits the removal of the leachable substance or the diluent exchange and hydration and washing to be conducted in a step-wise fashion simultaneously. A small quantity of clean fresh leaching fluid or hydrating water can be introduced into the cavity for a short period of time and then be flushed out to be replaced by a second quantity of clean, fresh fluid.

Since the mechanism for removal of leachable substances is mass transfer, this step-wise extraction maintains the mass concentration gradient high to speed up extraction.

This step-wise fluid introduction and flushing can be done any desired number of times. This significantly reduces the amount of solution that is needed and improves the efficiency of the leaching and hydration.

The process of the present invention is particularly well suited to lenses which are manufactured in a two-part mold like those described in U.S. Pat. Nos. 4,565,348 and 4,640,489 in the presence of a diluent like that described in U.S. Pat. No. 4,495,313. If the diluent used is a boric acid ester, the fluid used can be water. The ester is hydrolyzed in the presence of water to exchange the diluent for water and thus hydrate and wash the lens. When hydrating this type of lens, the hydration/washing/diluent extraction is preceded by the steps of opening the two-part mold leaving the lens blank in either the concave or convex mold part. The mold part in which the lens blank is left is then covered with the first carrier elements so that an optical surface of the lens blank is oriented toward a first surface of the first carrier element. The lens blank is then released from the mold part in which it was left, preferably by submerging the mold part in which the lens blank was left and the first carrier element together in water so as to initially hydrate the lens blank and cause it to separate from the mold part. It is desirable but not required that the mold part and the first carrier element be submerged at an angle to the horizontal so that the lens blank moves under the force of gravity from the mold part in which it was left to the first carrier element without trapping air between the lens blank and the first carrier element first surface and without permitting the lens blank to invert or roll over.

After the lens blank is released into the first carrier element, the first carrier element is covered with the second carrier element as described above and a fluid flow is introduced to flush leachable substances from the contact lens and to wash and hydrate the lens.

After the flushing, the lens can be deposited into an inspection carrier by one of two methods. The first of the two methods is to partially drain the cavity formed by the first and second carrier elements to deposit the lens blank in one of them. The remaining of the first or second carrier element is then removed and a third carrier element is introduced to which the lens is transferred by compressed air, gravity or a fluid flow and attached by, for example, surface tension. The third carrier element is then separated from the remaining of the first or second carrier elements and the third carrier element is oriented over an inspection carrier. The third carrier element is submerged in the inspection carrier so as to break the surface tension which hold the lens on the third carrier element and allow the lens to float freely into the inspection carrier. This third carrier element preferably has a convex surface to which the posterior surface of the lens blank is attached by surface tension. The dimensions of the convex surface of the third carrier element are chosen so that they can be easily submerged in the inspection carrier.

The second means for transferring the lens blank to the inspection carrier is to drain the cavity defined between the first and second elements and then to use air pressure to transfer the lens to the one of the first or second carrier elements that has a convex surface that will mate with the posterior surface of the lens. The transferring is done preferably by air pressure so that the lens attaches by surface tension to the appropriate carrier element. The appropriate carrier element is then aligned over an inspection carrier and transferred to the inspection carrier by a flow of compressed air or a flow of liquid.

It is preferred that the water used to hydrate the lens and which is used throughout the process of releasing the lens and hydrating and inspecting the lens is deionized water without any salts so that the time consuming ionic neutralization of the polymer from which the lens blank may be made does not have to occur during the hydration process.

When deionized water is used, the final step of the process is to introduce buffered saline solution to the inspection carrier after the inspection has been completed. The inspection carrier which may also be the final package for the lens is then sealed and final lens equilibration (ionic neutralization, final hydration and final lens dimensioning) is accomplished in the package at room temperature or during sterilization.

The use of deionized water is an important step in this process because it allows the time consuming ionic neutralization to be done essentially outside the hydration process after the lens has been packaged and sealed.

These and other features and advantages of the present invention will become more apparent when taken in conjunction with the following detailed description of the preferred embodiments and the following drawings.

BRIEF DESCRIPTION OF THE DRAWINGS

FIG. 1 shows a schematic representation of the entire process;

FIG. 6 shows a perspective view of a third carrier element used to transfer the hydrated lens to an inspection carrier which also serves as part of the final package of the lens. DETAILED DESCRIPTION OF THE PREFERRED EMBODIMENT Referring now to FIG. 1, there is shown a schematic representation of the entire process of the present invention which has three major components, namely: release of the lens from the mold in which it is made; hydration, washing and diluent extraction of the lens; and, the inspection and packaging of the lens.

The present process is used most beneficially in connection with lenses that are manufactured in two-part molds of the kind shown in U.S. Pat. Nos. 4,565,348 and 4,640,489 in the presence of a diluent, according to the process disclosed in is U.S. Pat. No. 4,495,313. As will be disclosed later, it is also possible to use the hydration step to hydrate dry hydrogel lens blanks made by lathe cutting or spin casting or other manufacturing processes.

The overall process of the present invention will now be discussed in connection with the schematic representation of the various steps of the process shown in FIG. 1 together with reference, when necessary, to the remaining figures which show some of the important apparatus used to carry out the process.

Figure 2:
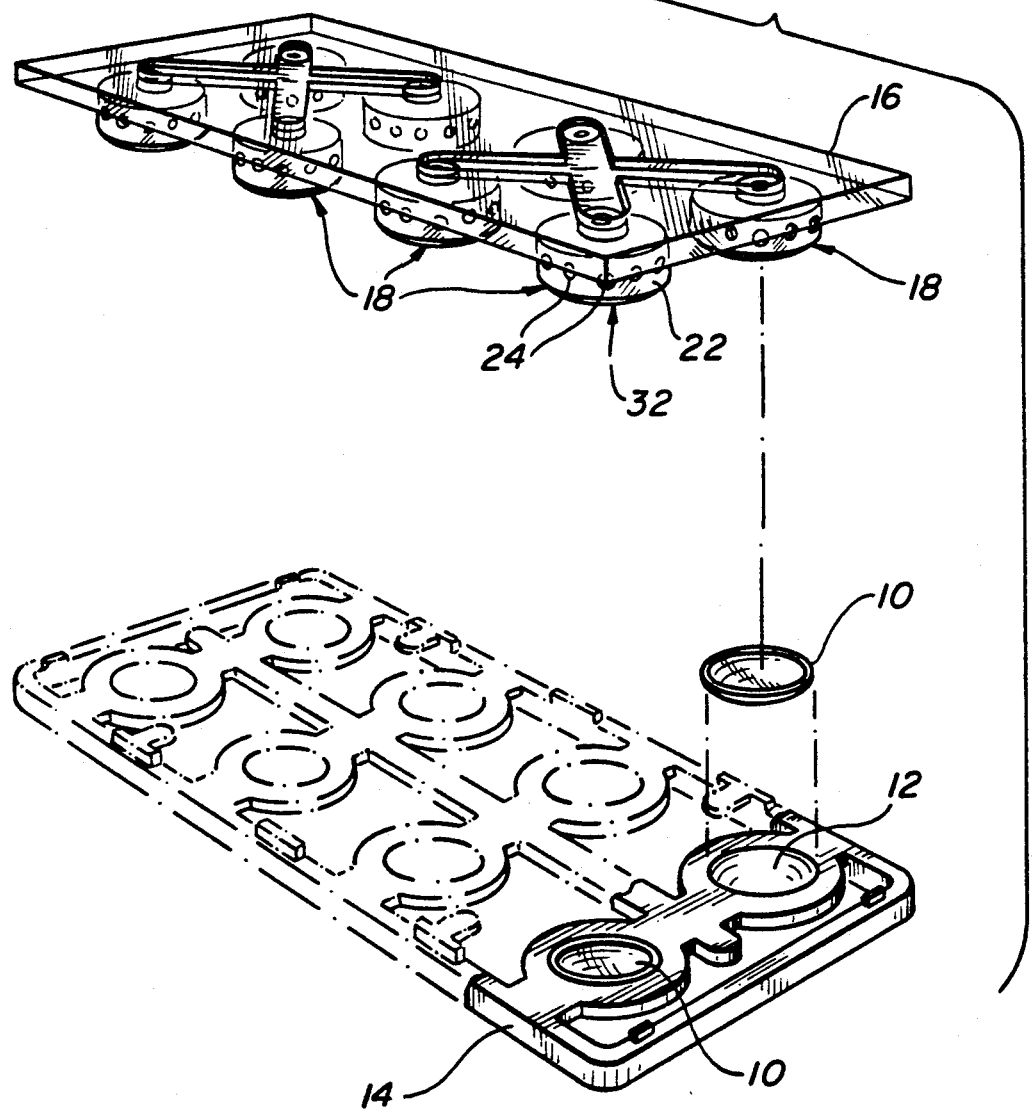
FIG. 2 shows a perspective view of a lens made in a multiple cavity mold shown in perspective and partly in phantom ready for assembly to a set of first carrier elements shown in perspective for use during the mold release steps of the process.

Contact lens blank are made in two-part molds like those shown in U.S. Pat. Nos. 4,565,348 and 4,640,489, by polymerizing monomer in the presence of a catalyst and a diluent with ultra violet light or heat according to the process described in U.S. Pat. No. 4,495,313. After the polymerization process is completed, the two halves of the mold are separated (this is called demolding) typically leaving the contact lens blank 10 in concave lens part 12 (see FIG. 2). FIG. 2 shows a mold frame 14 with eight concave mold cavities in which eight lenses can be made at once. For convenience in FIG. 1, the concave mold frame 14 is shown in an end view so only two mold cavities 12 are shown in FIG. 1. Any convenient number of mold cavities could be used on frame 14. There is also a convex mold frame having a similar number of mold parts which is not shown in the present application but is shown in U.S. Pat. No. 4,565,348, the entire disclosure of which is hereby incorporated by reference in this patent application. The first step after demolding is the first station in the process outlined in FIG. 1 and is identified by reference character 20.

At the second station 30 in the process of FIG. 1, a first carrier frame 16 carrying eight first carrier elements 18 is assembled over concave mold frame 14 so that each first carrier element 18 fits over each concave mold part 12 to confine each of lens blanks 10 in a cavity which is small enough to prevent the lens from rolling over or inverting during subsequent processing steps.

Figure 4:
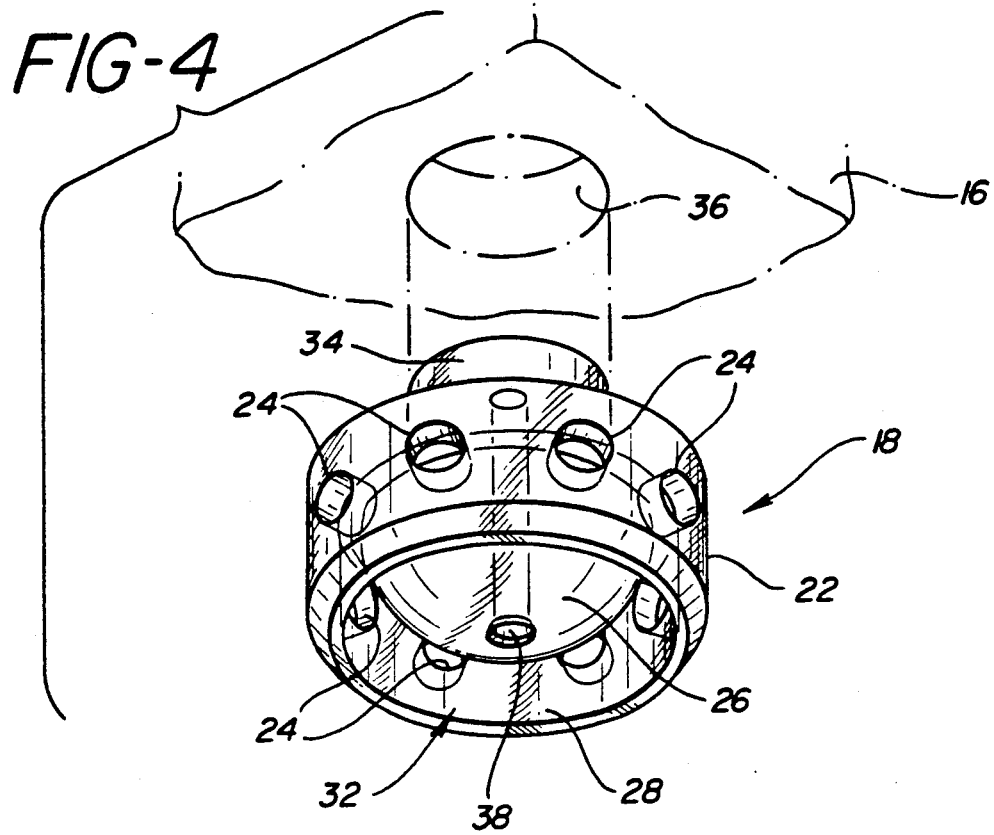
FIG. 4 shows a perspective view of a single one of the first carrier elements shown in FIG. 1.

First carrier element 18 is shown in perspective in FIG. 4 as an individual element which can be assembled into first carrier frame 16 shown in phantom in FIG. 4. First carrier element 18 has a generally cylindrical shape defined by a surrounding side wall 22 in which is placed a plurality of openings 24 whose purpose will be explained later in the application. Openings 24 are preferably circular or slots but can be any convenient shape. First carrier element 18 has a convex surface 26 which combines with the interior surface 28 of surrounding side wall 22 to form a recess 32. First carrier element 18 has a boss 34 which fits into a corresponding bore 36 in first carrier frame 16. Recess 32 in first carrier element 18 combines with the outer flange of mold part 12 to form a cavity confining lens blank 10. First carrier element 18 has a bore 38 extending through boss 34 and convex surface 26 to provide fluid communication through first carrier element 18 into recess 32 as will be explained later in the application when discussing the hydration/washing/extraction steps of the process. At the next station 40 in the process, first carrier frame 16 and concave mold frame 14 are rotated approximately 135° the counterclockwise direction so that first carrier frame 16 is below concave mold frame 14, but the two are oriented at an angle of approximately 45° to the horizontal. They are then submerged in a tank 42 of deionized water at a temperature greater than the glass transition temperature of the material from which lens blank 10 is made.

In the present invention, the lens blank is preferably made of HEMA (hydroxyethylmethacrylate). The deionized water also includes small amounts of sufactants to assist in releasing lens blank 10 from concave mold part 12. As lens blank 10 is submerged, it immediately swells in the presence of the deionized water and the swelling helps release lens blank 10 from contact with concave mold part 12. The reason for orienting frames 14 and 16 in an angle of approximately 45° to the horizontal is to permit lens blank 10 to drop downwardly from concave mold part 12 onto the convex surface 26 of first carrier element 18 without trapping air between the posterior surface of lens blank 10 and convex surface 26 of first carrier element 18. These angles are preferred but any convenient angle may be used.

The use of deionized water in release tank 42 is particularly important when using lens blanks 10 made of materials which have ionic characteristics. If one were to use water laden with various salts, one would start the neutralization process of any ionic species in the lens material. This neutralization takes an extended period of time and causes some temporary instability in the dimension of the lens.

After a specified period of time when the lens has reached stable dimensions, preferably about five (5) minutes, the assembly of concave mold frame 14 and first carrier frame 16 are removed from release tank 42 and held at an angle for a short period of time to permit the drainage of excess water from the cavity defined between each first carrier element 18 and its corresponding concave mold part 12. The water drains out of first carrier element 18 through holes 24 in the side wall of each first carrier element 18. The posterior surface of lens blank 10 thus attaches itself by surface tension to convex surface 26 of first carrier element 18.

At the next station 50 in the process, first carrier frame 16 is rotated back so it is on top of concave mold frame 14. Concave mold frame 14 is dropped from first carrier frame 16 leaving lens blank 1 attached to convex surface 26 of each first mold carrier 18.

Figure 3:
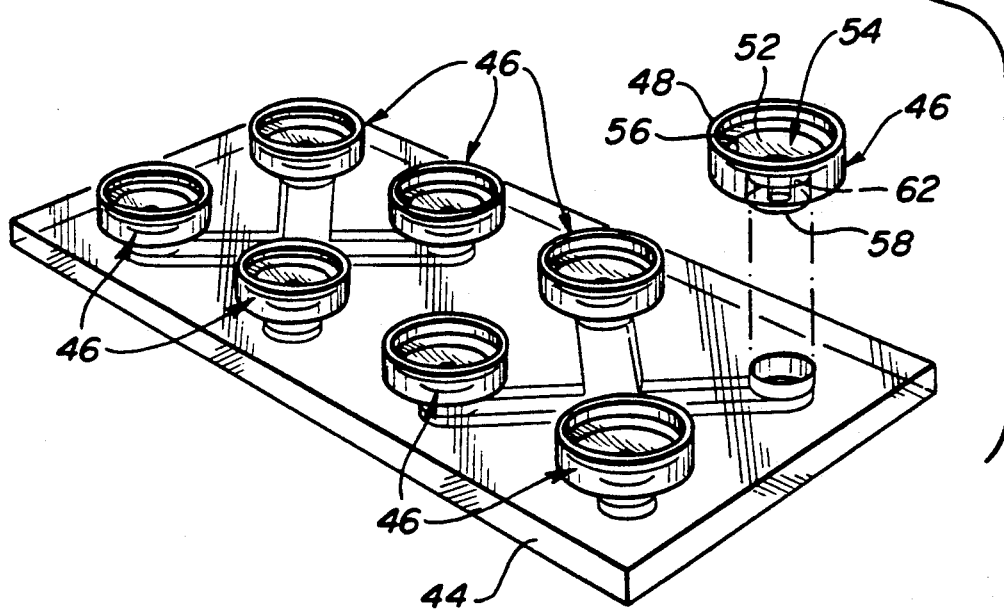
FIG. 3 shows a perspective view of a set of second carrier elements to be assembled with the first carrier elements and to be used during the hydration steps of the process.
Figure 5:
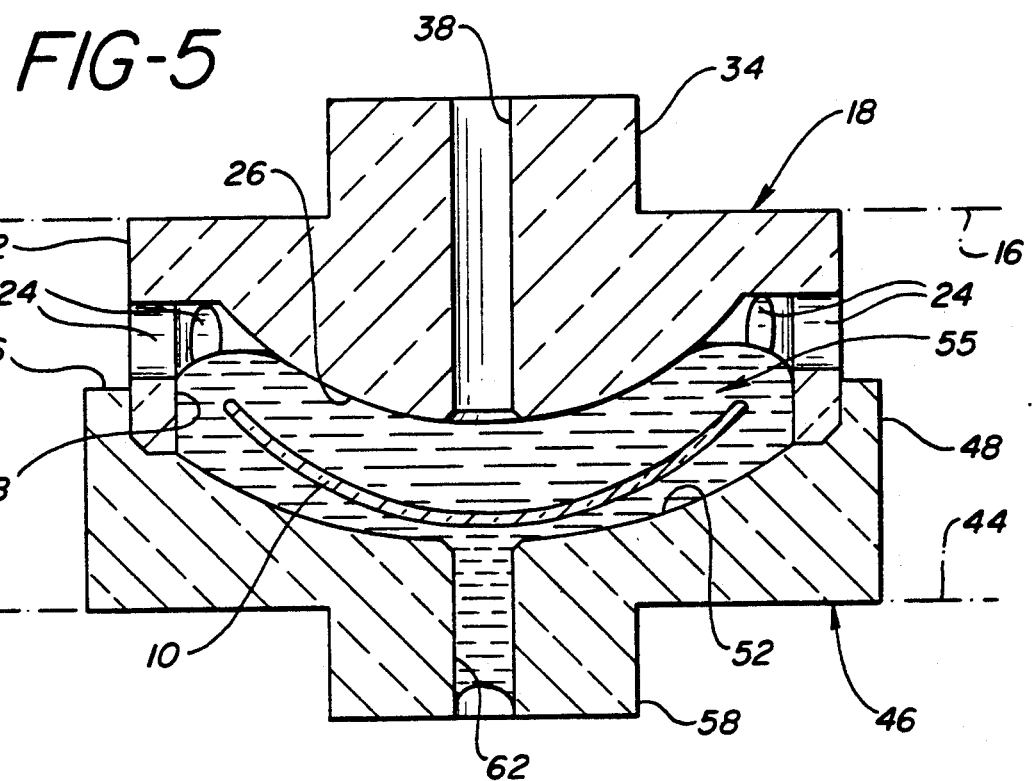
FIG. 5 shows a cross-sectional view of a single one of the first carrier elements shown in FIG. 2 and the second carrier element shown in FIG. 3 assembled together with a lens placed in the cavity defined between the first and second carrier elements.

At the next station 60 of the process, a second carrier element frame 44 is placed under first carrier element frame 16 and aligned to form a cavity confining lens blank 10 so that is may not roll over or invert during subsequent processing steps. Second carrier element frame 44 is shown in more detail in FIG. 3. Second lens carrier frame 44 holds an array of preferably eight second carrier elements 46, but any convenient number of second carrier elements 46 can be used. Referring now to FIG. 5, it can be seen that second carrier element 46 has a generally cylindrical shape with a surrounding side wall 48 and a concave surface 52 defining a recess 54 (See FIG. 3).

The carrier elements 18 and 46 and carrier frames 16 and 44 used in this process are more particularly described in a co-pending patent application U.S. Ser. No. 07/510,341 entitled "Chamber for Hydrating Contact Lenses" filed on Apr. 17, 1990 and assigned to the assignee of the present invention and filed on the same date as the present application. The entirety of that patent application is hereby incorporated in this patent application by reference.

Referring again to FIG. 5, it can be seen that the inside diameter of surrounding side wall 48 of second carrier element 46 receives the outside diameter of surrounding side wall 22 of first carrier element 18 in a close fit. Openings 24 in side wall 22 of first carrier 18 extend above the upper surface of 56 of surrounding side wall 48 of second carrier element 46. The confronting convex surface 26, inside wall 28 and concave surface 52 provide a cavity 55 for confining lens blank 10 so that it will not roll over or invert during subsequent processing steps. Second carrier element 46 includes a cylindrical boss 58 similar to boss 34 of first carrier element 18 to permit second carrier element 46 to be assembled easily to second carrier frame 44. Second carrier element 46 includes a bore 62 extending through boss 58 and concave surface 52 into recess 54. It can be appreciated from FIG. 5 that the cavity 55 defined by the confronting surfaces of first and second carrier elements 18 and 46 can be connected to a source of fluid through either or both of bores 24 in side wall 22 of first carrier 18. The direction of flow can be varied according to the requirements of the process.

At the next station 70 in the process of the present invention, deionized water is introduced through bores 38 and 62 simultaneously to fill cavity 55 to permit the extraction of impurities from lens blank 10. In the preferred embodiment, lens blank 10 contains an inert but water soluble diluent, for example, a boric acid ester of the kind described in U.S. Pat. No. 4,495,313. For diluent containing lenses, the purpose of the hydration/washing/extraction step is also to exchange the diluent for water. When the diluent containing lens blank 10 is exposed to deionized water, the ester hydrolizes to glycerol and boric acid which leave lens blank 10 and goes into the fluid contained in cavity 55. This exchange is driven by the physical phenomenon of mass transfer and depends on the concentration gradient of the impurities and the products of hydrolysis between lens blank 10 and the fluid in the cavity 55. As the extraction continues the concentration gradient diminishes and the process slows down. Thus, it has been found useful to conduct the hydration/washing/extraction in a series of discrete steps where a quantity of fresh liquid is introduced into cavity 55 through one or both of bores 38 and 62 and leaving the liquid in cavity 55 by blocking the flow through bores 38 and 62.

After the hydration/washing/extraction has proceeded for a period of time, on the order of a few minutes and preferably about two minutes, openings 38 and 62 are unblocked permitting a new quantity of fluid to be introduced into cavity 55 while flushing the old fluid out of openings 24. When cavity 55 is filled with fresh deionized water, openings 38 and 62 are again blocked and lens blank 10 is permitted to hydrate for a further period of time int he deionized water confined in cavity 55. This step-wise extraction continues for a predetermined number of times until the extraction of diluent and impurities is complete. The number of extractions is dependent on the quantity of fluid used and the time the lens is allowed to soak prior to the next extraction. I have found that six extractions in deionized water will satisfactorily complete the extraction using approximately 2.5 ml of water. I have determined experimentally that the glycerol concentration in the deionized water after extraction lens blank 10 is reduced well below detectable limits by the sixth extraction.

It would also be possible to have a continuous flow of deionized water through cavity 55 and I believe that would provide satisfactory results, however, I prefer to use the step-wise extraction discussed above.

This extraction step could also be used to remove any leachable substance from any contact lens blank, whether the lens blank was made by lathe cutting, spin casting, molding or some other method. Dry lathe cut or spin cast lens blanks 10 could be leached starting at station 50 in this process and continuing through stations 60 and 70. Dry lens blanks 10 can be placed in first carrier frame 16 and then covered with second carrier frame 44 and subjected to extraction with a desired solvent which can be water, alcohol, a mixture of water and alcohol or any organic solvent suitable to remove the substance one wishes to leach from the lens blank. Once the leaching is accomplished, the process can continue through additional processing steps.

One proceeds from station 70 where the hydration/washing/extraction is accomplished to stations 80, 90, 100 and 110 where lens blank 10 is transferred to an inspection carrier 74 which may be part of the final package for lens blank 10. At station 80, first carrier frame 16 is removed leaving the hydrated lens blank 1 settled in concave carrier element 46. The second carrier frame 44 is moved to station 90 where it is covered with a third carrier frame 63 which contains a number of third carrier elements 64 shown particularly in FIG. 6.

Third carrier element 64 is generally cylindrical and has a convex surface 66, a boss 68 for attaching it to its third carrier frame 63 and a bore 72 extending through boss 72 and convex surface 66 to permit the flow of fluid through third carrier element 64. It will be noted that third carrier element 64 has no surrounding side wall so that, as will be explained later, concave surface 66 can be submerged within inspection carrier 74. If third carrier element 64 were to have a surrounding side wall, that side wall would make it more difficult to place the lens into inspection carrier 74.

As shown at station 90 in FIG. 1, lens blank 10 is then transferred from the concave surface 52 of second carrier element 46 by for example, a flow of pressurized fluid. I prefer compressed air. Lens blank 10 then attaches itself by surface tension to convex surface 66 of third carrier elements 64 on third carrier frame 63. Second carrier frame 44 is then removed and third carrier frame 63 is transferred to station 100 and oriented above inspection carrier 74 which contains a plurality of individual packages 76 defining recesses 78. A quantity of deionized water is then introduced through bores 72 to transfer lens blank 10 to recesses 78 of inspection carrier 74.

The process at stations 80, 90 and 100 may be modified. After the lens is hydrated at station 70, lens blank 10 settles by gravity against concave surface 52 of second lens carrier 46. Compressed air may then be introduced through bore 62 to transfer the lens blank to convex surface 26 of first carrier element 18. The posterior surface of lens blank 10 will attach itself to convex surface 26 by surface tension. First carrier frame 16 is then transferred to a location above inspection carrier 74. Compressed air or other fluid, for example, deionized water is introduced through bores 38 of first carrier elements 18 to deposit lens blank 10 in recesses 78 of inspection carrier 74. The surrounding wall 22 of first carrier elements 18 does not permit lens carrier 18 to be submerged in recesses 78 of inspection carrier 74, requiring lens blank 10 to be forced off convex surface 26. Although this alternative process is satisfactory, I prefer to use the process described above for stations 80, 90 and 100 where third carrier elements 64 are used.

At station 110, third carrier frame 63 is removed and inspection carrier 74 is moved to an inspection station 120 where it may be inspected manually or by automated optical machinery.

At station 130, the deionized water is removed from recesses 78 of inspection carrier 74 and replaced at station 140 with a saline solution which has a pH and osmolality compatible to that of the tears of the human eye. Alternately, an aliquot of concentrated brine solution may be added to the deionized water such that the final solution has the same pH and osmolality mentioned above. Saline solution is used so that when the user removes the lens from the package ready to insert on to ones cornea, the pH and osmolality of the lens will be balanced with that of the eye so that the lens will not irritate the eye when inserted.

If the material from which lens blank 10 is made has an ionic characteristic, the salts in the saline solution will neutralize that ionic species. However, that neutralization can be done in the final package on the shelf outside the remainder of the manufacturing process. At station 150, inspection carrier 74 is packaged, for example, hermetic seal with a material that does not permit liquid to transfer through the package material.

It will be noted that the shape of the recess 78, in which the lens is deposited at station 100, is important to keep the lens properly positioned for inspection. Thus, it can be seen from FIG. 6 that recess 78 is generally spherical in shape with a radius of curvature larger than the radius of curvature of the convex surface of lens blank 10, permitting lens blank 10 to center itself on surface 52 by gravity. Surface 52 provides a low friction for wet lens blanks to let the lens stay on center as inspection carrier 74 is moved from station to station through the inspection process. It will also be noted that the size of recess 78 is small enough to confine the lens after it is sealed into its package so that it may not roll over or invert during storage or shipment. This assures that the lens is always in the proper orientation when the package is opened so that the user will always be assured that the lens is in the same position ready for placement on the cornea of the eye.

It can be seen that the present process substantially reduces the amount of water, chemicals and time needed to hydrate the lens and do the diluent exchange. The use of deionized water is a particularly useful step in that it postpones the neutralization of the ionic species in the polymer from which the lens is made.

The present process also provides control of the positioning of the lens throughout the process so that it is always oriented properly and can be placed in the package in a consistent manner all the time so that when one removes the lens from the package one knows that it is properly oriented for placement on the eye. The present process also substantially reduces handling of the delicate lens.

The time reductions accomplished in the present process are significant. The release step is accomplished in less than ten (10) minutes normally less than five (5) minutes. The hydration/washing/extraction process is accomplished in less than a half hour at room temperature. The equilibration or acid neutralization process and final dimensional stabilization of the lens is accomplished in less than two hours at room temperature after lens blank 10 has been placed and sealed in its final package.

The present invention has been described in conjunction with preferred embodiments. Those skilled in the art will appreciate that many modifications and changes may be made to the preferred embodiments without departing from the scope of the present invention. It is, therefore, not intended to limit the present invention except to set forth in the appended claims.

I claim:

1. A process for a hydrating hydrophilic polymer contact lens blanks to form a hydrogel contact lens, said lens blank having an anterior optical surface and a posterior optical surface;
   placing said lens blank in a first carrier element with an optical surface of said lens blank oriented toward a first surface of said first carrier element;
   covering said lens blank with a second carrier element with the other optical surface of said lens blank oriented toward a first surface of said second carrier element;
   said first and second carrier elements cooperating to define a cavity to confine said lens blank therein and maintain the orientation of said lens blank anterior and posterior surfaces without permitting said lens blank to invert or roll over;
   providing a flow of water into said cavity through said first carrier element and about the surface of said lens blank facing said first carrier element first surface;
   providing a flow of water into said cavity through said second carrier element and about the other surface of said lens blank;
   providing a flow of water out of said cavity;
   said flow of water permitting hydration of said lens blank and extraction of impurities.

2. The process of claim 20 wherein said lens blank is formed in a two-part mold including a concave mold part for molding the anterior surface of said lens blank and a convex mold part for molding the posterior surface of said lens blank;
   and said step of placing said lens blank in a first carrier element includes;
   opening said two-part mold leaving said lens blank in either said concave or convex mold parts;

covering said mold part in which said lens blank is left with said first carrier element so that an optical surface of said lens blank is oriented toward said first surface of said first carrier element;

retaining said first carrier element first surface so oriented with respect to said lens blank;

releasing said lens blank from the mold part in which it was left;

attaching said lens blank to said first surface of said first carrier element;

holding said lens blank on said first carrier element first surface;

disengaging said mold part from said first carrier element.

3. The process of claim 1 wherein said first carrier element includes a recess defined by a base and a surrounding side wall, said base including said first carrier element first surface.

4. The process of claim 1 wherein said second carrier element includes a recess defined by a base and a surrounding side wall, said base including said second carrier element first surface.

5. The process of claim 2 wherein said release step includes submerging said mold part in which the lens blank is left and said first carrier element together in water so as to initially hydrate the lens blank and cause it to separate from the mold part in which said lens blank was left;

said mold part and said first carrier element submerged at an angle to the horizontal so that said lens blank moves under the force of gravity from said mold part to said first carrier element without trapping air between the lens blank and said first carrier element first surface and without permitting said lens blank to invert or roll over.

6. The process of claim 2 wherein said holding step includes holding said lens blank on said first carrier element first surface by surface tension.

7. The process of claim 1 wherein said water used in said process is deionized water.

8. The process of claim 1 wherein said lens blank includes a diluent in said hydrophilic polymer and said hydration step includes the step of removing said diluent.

9. The process of claim 8 wherein said diluent includes a boric acid ester and the step of removing said diluent includes hydrolyzing said ester and removing glycerol and boric acid products of hydrolysis from said lens blank.

10. The process of claim 9 wherein said hydration step is accomplished in a plurality of discrete steps wherein a quantity of water is introduced into said cavity and permitted to stay in said cavity for a predetermined period of time and is then removed from said cavity and replaced by another quantity of fluid;

said introduction and removal of fluid carried out a sufficient number of times to reduce said diluent to a desired level and to permit hydration of the lens to a desired level.

11. The process of claim 10 wherein said flushing step is carried out six times and said water is permitted to stay in said cavity for about two minutes during each of said six hydration steps.

12. The process of claim 1 wherein said flow about said lens blank is introduced near the center of said cavity from both the first and second carrier elements and flows radially along said lens blank and out of the cavity near the periphery thereof.

13. The process of claim 1 further including additional steps following said hydration and extraction step comprising:
at least deposition by gravity of said lens blank into one of said first or second carrier elements;
separating said first and second elements;
depositing said lens from said first or second carrier element to which it is attached into an inspection carrier.

14. The process of claim 13 wherein said deposition step includes placing a quantity of water in said inspection carrier, lowering said first or second carrier element below the surface of the water in said inspection carrier to permit lens to float off said first or second carrier element and deposit in said inspection carrier.

15. The process of claim 13 wherein said inspection carrier is a part of the final package for the lens.

16. The process of claim 15 further including the step of sealing said lens package.

17. The process of claim 13 wherein said inspection carrier includes a recess defined by a base and a surrounding wall, said recess having a depth significantly less than the diameter of the lens and said recess having transverse dimensions only slightly larger than the diameter of the lens so that the lens may not roll over or invert in the inspection carrier.

18. The process of claim 17 wherein said inspection carrier recess base has a substantially concave shape to cause the lens to center itself on said concave recess base.

19. The process of claim 18 wherein said concave recess base has a radius of curvature greater than the radius of curvature of the anterior surface of said lens blank and said base includes a low friction surface so that said lens blank will tend to be self centering on said base.

20. The process of claim 13 wherein said water is deionized water and lens inspection carrier is part of the final package for the lens further including the step of removing said deionized water from said lens package and adding a quantity of buffered saline solution to said lens package;
sealing said package;
said saline solution having a pH value similar to that of human tears;
said saline solution in said package neutralizing any ionic species remaining in the hydrogel polymer of which the lens is made.

21. The process of claim 13 further including additional steps following said step of separating said first and second carrier elements, comprising:
covering the lens carrier element on which said lens has been deposited with a third lens carrier element having a first surface disposed in confronting relationship to a surface of said lens blank;
said third lens carrier element and said first or second carrier elements cooperating to define a cavity to confine said lens blank without permitting said lens blank to invert or roll over;
transferring said lens blank from said one of said first or second carrier elements on which said lens was deposited to said third lens carrier element;
holding said lens on said third lens carrier by surface tension;
separating said first or second carrier element from said third lens carrier element; and,
depositing said lens from said third lens carrier element into a lens inspection carrier.

22. The process of claim 21 wherein said transfer step includes injecting air into said first or second carrier element to drive said lens blank to said third lens carrier element.

23. The process of claim 21 wherein said step of depositing said lens from said third carrier element into said inspection carrier includes the step of lowering said third carrier element into said inspection carrier introducing a flow of water through said third lens carrier element behind the lens to break said surface tension thereby filling said inspection carrier with a volume of water sufficient to cover said lens.

24. The process of claim 21 wherein said step of depositing said lens from said third carrier element into said inspection carrier includes the step of placing a quantity of water into said inspection carrier, lowering said third carrier element into said water in said inspection carrier to submerge said lens and break said surface tension to permit said lens to flat free into said inspection carrier.

25. The process of claim 13 wherein said water is deionized water and said lens inspection carrier is part of the final package for said lens further including the step of adding a quantity of buffered saline solution to said lens package;
sealing said lens package;
said saline solution having a pH value similar to that of human tears;
said saline solution in said package neutralizing any acid remaining in the hydrogel polymer of which the lens is made.

26. The process of claim 1 wherein said hydration steps results in approximately forty percent water content for the lens.

27. The process of claim 13 wherein the hydration steps results in approximately forty percent water content for the lens and said water is deionized water, said deionized water and said lens with a forty percent water content providing a sufficient difference in index of refraction between the deionized water in said to facilitate visualization and inspection of the lens.

28. The process of claim 13 wherein said depositing of said lens blank into said inspection carrier is done by compressed air.

29. The process of claim 13 wherein said depositing of said lens blank into said inspection carrier is done by a flow of water.

30. A process for removing one or more leachable substances form a hydrophilic polymeric contact lens blank, sad lens blank having an anterior surface and a posterior surface, comprising;
confining said lens blank in a cavity to maintain the orientation of said lens blank without permitting said lens blank to invert over or roll over;
providing a flow of fluid into said cavity and about said anterior surface of said lens;
providing a flow of fluid including water into said cavity and about posterior surface of said lens; and,
providing a flow of said fluid out of said cavity to permit extraction of leachable substances including a boric acid ester from said lens blank and for hydrolyzing said ester and removing glycerol and boric acid products of hydrolysis from said lens blank.

31. The process of claim 30 wherein said extraction step further includes hydrating the hydrophilic polymer.

32. The process of claim 31 wherein the extraction step includes the process of introducing water into said cavity about said anterior surface and said posterior surface of said lens;
permitting said water to remain in said cavity for a predetermined period of time.

33. A process for removing one or more leachable substances from a polymeric contact lens blank, sad lens blank having an anterior surface and a posterior surface, comprising;
confining said lens blank in a cavity to maintain the orientation of said lens blank without permitting said lens blank to invert over or roll over by:
placing said blank in a first carrier element with said posterior surface of said lens blank oriented toward a first surface of said first carrier element;
covering said lens blank with a second carrier element with said lens blank anterior surface confronting a first surface of said second carrier element;
said first and second carrier elements cooperating to define said cavity for confining said lens blank with said lens blank posterior surface oriented toward said first carrier element first surface and said lens blank anterior surface oriented toward said second carrier element first surface;
providing a flow of fluid into said cavity and about said anterior surface of said lens;
providing a flow of fluid into said cavity and about said posterior surface of said lens;
providing a flow of said fluid out of said cavity to permit extraction of leachable substances form said lens blank;
depositing said lens blank in one of said first or second carrier elements;
separating said first and second carrier elements;
covering the one of said first or second carrier elements in which the lens blank is deposited with a third carrier element;
transferring and attaching said lens blank to third carrier; and
depositing said lens blank from said third carrier element into a quantity of fluid in a lens inspection carrier, while maintaining the lens blank orientation without permitting the lens blank to invert or roll over, said inspection carrier having a volume and shape to maintain said lens blank so oriented during subsequent processing and inspection.

34. The process of claim 33 wherein said lens inspection carrier is part of the final package for the lens blank.

35. The process of claim 33 wherein said transferring is done with compressed air and said attaching is done by surface tension.

36. A process for removing one or more leachable substances form a polymeric contact lens blank, aid lens blank having an anterior surface and a posterior surface, comprising;
confining said lens blank in a cavity to maintain the orientation of said lens blank without permitting said lens blank to invert over or roll over;
providing a flow of fluid into said cavity and about said anterior surface of said lens;
providing a flow of fluid into said cavity and about said posterior surface of said lens; and,
providing a flow of said fluid out of said cavity to permit extraction of leachable substances from said lens blank, wherein said extraction step is accomplished int a plurality of discrete steps wherein the quantity of fluid is introduced into said cavity and permitted to stay in said cavity for a predetermined period of time and is then removed from said cavity and simultaneously replaced by another quantity of fluid, introduction and removal of fluid carried out a sufficient number of time sot reduce said leachable substances to a desired level.

37. A process for removing one or more leachable substances from a polymeric contact lens blank, said lens blank having an anterior surface and a posterior surface, comprising;

confining said lens blank in a cavity to maintain the orientation of said lens blank without permitting said lens blank to invert over or roll over;

providing a flow of fluid into said cavity and about said anterior surface of said lens;

providing a flow of fluid into said cavity and about said posterior surface of said lens, said flow of fluid into the anterior surface of said lens blank initiated at a different time form the flow of fluid into the posterior surface of said lens blank; and providing a flow of said fluid out of said cavity to permit extraction of leachable substances form said lens blank.

* * * * *

UNITED STATES PATENT AND TRADEMARK OFFICE
CERTIFICATE OF CORRECTION

PATENT NO. : 5,080,839
DATED : Jan. 14, 1992
INVENTOR(S) : Ture Kindt-Larsen It is certified that error appears in the above-identified patent and that said Letters Patent is hereby corrected as shown below:

Claim 2, col. 10, line 60, claim "20" should read claim "1"

Claim 24, col. 13, line 19, delete "flat" and insert "float"

Claim 30, col. 13, line 50, delete "sad" and insert "said"

Claim 33, col. 14, line 8, delete "sad" and insert "said"

Claim 33, col. 14, line 32, delete "form" and insert "from"

Claim 36, col. 14, line 56, delete "aid" and insert "said"

Claim 36, col. 15, line 1, delete "int" and insert "in"

Claim 36, col. 15, line 7, before the word "introduction" insert "said"

Claim 36, col. 15, line 8 delete "time sot" and insert "times to"

Claim 37, col. 16, line 12, delete "form" and insert "from"

Signed and Sealed this

Thirteenth Day of July, 1993

*Attest:*

MICHAEL K. KIRK

*Attesting Officer*   Acting Commissioner of Patents and Trademarks